(12) United States Patent
Lu et al.

(10) Patent No.: US 8,992,873 B2
(45) Date of Patent: Mar. 31, 2015

(54) HOLLOW SILICA PARTICLES AND METHOD FOR PRODUCING THE SAME

(75) Inventors: Hsu-Tung Lu, Taichung (TW); Mei-Hui Tsai, Taichung (TW); I-Hsiang Tseng, Taichung (TW); Shih-Liang Huang, Taichung (TW)

(73) Assignee: National Chin-Yi University of Technology, Taichung (TW)

( * ) Notice: Subject to any disclaimer, the term of this patent is extended or adjusted under 35 U.S.C. 154(b) by 476 days.

(21) Appl. No.: 13/418,400

(22) Filed: Mar. 13, 2012

(65) Prior Publication Data

US 2013/0244032 A1    Sep. 19, 2013

(51) Int. Cl.
| | | |
|---|---|---|
| *C01B 33/12* | (2006.01) | |
| *B29B 9/12* | (2006.01) | |
| *B32B 5/16* | (2006.01) | |

(52) U.S. Cl.
CPC ... *B29B 9/12* (2013.01); *B32B 5/16* (2013.01); *C01B 33/126* (2013.01); *C01B 33/12* (2013.01); *C01P 2004/34* (2013.01)
USPC .......................................... 423/339; 428/402

(58) Field of Classification Search
None
See application file for complete search history.

(56) References Cited

U.S. PATENT DOCUMENTS

2010/0069237 A1* 3/2010 Yano et al. ..................... 502/439
2011/0229576 A1* 9/2011 Trogler et al. ................ 424/490

* cited by examiner

*Primary Examiner* — Melvin C Mayes
*Assistant Examiner* — Michael Forrest
(74) *Attorney, Agent, or Firm* — Fishman & Associates, LLC.

(57) ABSTRACT

The present invention provides a method of producing hollow silica particles. First, an amine-ketimine compound is mixed with water to obtain a hydrophobic core dispersion, and then an organic siloxane compound and/or a coupling reagent is added into the hydrophobic core dispersion to form a core-shell silica dispersion. Then, the core-shell silica precipitate is separated from the core-shell silica dispersion, and then it is further dispersed and washed by a low carbon alcohol solution. Finally, hollow silica particles in accordance with the present invention are produced. In addition, the present invention also provides hollow silica particles produced by the afore-mentioned method without using any additional surfactant.

19 Claims, 3 Drawing Sheets

HOLLOW SILICA PARTICLES AND METHOD FOR PRODUCING THE SAME

BACKGROUND OF THE INVENTION

1. Field of the Invention

The present invention relates to a method for producing hollow silica particles, and more particularly to a method of utilizing the amine-ketimine compound as a core template for producing hollow silica particles. In addition, the present invention also relates to hollow silica particles produced by the afore-mentioned method.

2. Description of the Prior Arts

Hollow silica particles, e.g. silicon dioxide particles with hollow structure, can be applied in a quite wide range of applications such as catalysts, absorbents, gas storage, capsule material, material with low dielectric constant, and various hollow tube materials. Besides, the hollow silica particles can be further applied in a medical related filed due to their properties of large specific surface area, high mechanical stability, low toxicity, and high biocompatibility.

Recently, processes for producing particles with hollow structure can be classified into template method, liquid-phase method, vapor-phase method, and arc discharge method. Wherein, the template method relates to a synthesis method that can effectively control the morphology of particles, and it is further divided into hard template and soft template approaches depending on the characteristics of the template. By choosing various templates, compounds formed in various structures can be produced by the template methods.

For hard template method, resin balls or solid metal compounds, such as polystyrene (PS), polymethyl(meth)acrylate (PMMA) and hematite, are usually used as the core template. Silica shells are formed onto the core template by chemical vapor deposition or high-temperature pyrolysis. After removing core template by acid etching or calcination, the hollow silica particles are finally produced. For soft template method, a liquid or gas, such as alkanes or primary amines having carbon numbers from 6 to 18, segmented poly(ethylene glycol)-poly(propylene glycol)-poly(ethylene glycol) (PEG-PPG-PEG, F127), are usually used as the core template to produce hollow silica particles.

Generally, a hydrophobic material is usually used as the core template. Siloxane precursor for forming silica shells becomes a negative charge medium after its hydrolysis. In order to improving the affinity between the core template and silocane precursor, the surface of hydrophobic core template is modified with polycations or cationic surfactant to become positive-charged, or absorbs a coupling reagent, poly(vinyl pyrrolidone). Therefore, the hydrolyzed siloxane precursor can be adsorbed onto the surface of the modified hydrophobic core template. Subsequently, the organic siloxane compounds will be subjected to a co-condensation reaction on micelle surfaces, and then the produced silicon dioxides are deposited onto the micelle surface and formed a core-shell structure. After high-temperature sintering or acid etching, a shell-shaped ball having hollow structure will finally be produced.

Hence, according to the conventional method for producing hollow silica particles, there is a need to add surfactants and acid or basic solution to form the hollow silica particles.

SUMMARY OF THE INVENTION

In order to simplify the production process and reduce the production cost of the hollow silica particles, the present invention provides a method for producing hollow silica particles without adding additional surfactants, and thereby improving the value of hollow silica particles in various applications.

The primary objective of the present invention is to provide a method for producing hollow silica particles, which can simplify the process of hollow silica particles compared with the afore-mentioned method in the prior art. According to this method in accordance with the present invention, the silica particles having hollow structure are produced without using any additional surfactant, and the core template for producing hollow silica particles can be removed without using any acidic or basic solution.

To achieve the afore-mentioned objective, the present invention provides a method for producing hollow silica particles, comprising steps of: (A) mixing an amount of amine-ketimine compound and water to obtain a hydrophobic core dispersion; (B) adding an amount of an organic siloxane compound and/or an amount of a coupling reagent into the hydrophobic core dispersion to obtain a core-shell silica dispersion and to form a core-shell silica precipitate, wherein the coupling reagent includes an amino siloxane compound or a silicon-ketimine compound; (C) separating the core-shell silica precipitate from the core-shell silica dispersion; and (D) washing the core-shell silica precipitate by using a low carbon alcohol solution to obtain the hollow silica particles.

According to the afore-mentioned method for producing hollow silica particles of the present invention, a Schiff base compound such as an amine-ketimine compound is used for forming a core template, and then siloxane groups of the organic siloxane compound around the core template is subjected to a co-condensation reaction to form a silica shell surrounding the core template, and forming the core-shell silica precipitate dispersing in the solution.

Said "Schiff base compound" relates to an imine-based compound represented by the following chemical formula $R_xR_yC=NR_z$, wherein $R_z$ may be an alkyl group or an aryl group. For example, the Schiff base compound is an amine-ketimine compound or a silicon-ketimine compound.

According to the method for producing hollow silica particles of the present invention, said organic siloxane compound is preferably tetraethoxysilane (TEOS) or an amino siloxane compound. Preferably, the organic siloxane compound and an amine catalyst can be formed as one same amino siloxane compound such as γ-aminopropyltrimethoxysilane, APTMS.

According to the method for producing hollow silica particles of the present invention, APTMS is a coupling reagent for co-condensation reaction, and it may further be a self-catalyst by its basic amino group to catalyze TEOS around the core template undergoing the co-condensation reaction in a sol-gel method. Thereby, a silica shell will be formed surrounding the surface of the core template. That is, APTMS can be used as both reagents, amino siloxane compound and amine catalyst. When a coupling reagent such as APTMS is added, the amine catalyst such as ammonia is no more required for producing hollow silica particles.

According to the method for producing hollow silica particles of the present invention, without adding APTMS as the coupling reagent, the step (A) of the method further comprises mixing ammonia with the amine-ketimine compound and water to obtain the hydrophobic core dispersion, or the step (B) of the method further comprises adding ammonia into the hydrophobic core dispersion to obtain the core-shell silica dispersion and to form the core-shell silica precipitate. Here, ammonia can be an amine catalyst and contains an amount of $NH_3$ ranging from $1.0 \times 10^{-4}$ to $7.4 \times 10^{-2}$ mol (moles) per 100 ml water; and preferably ranging from $7.0 \times 10^{-4}$ to $4.4 \times 10^{-2}$ mol per 100 ml water.

In accordance with the method of the present invention, said amine-ketimine compound can be a hydrophobic nucleating reagent to form a core template, which is used for producing hollow silica particles. Wherein, the hydrophobic nucleating reagent of the method in accordance with the present invention can further comprise amine-ketimine mixtures, and the amine-ketimine mixtures comprise various amine-ketimine compounds having different substituent groups, bis(amine-ketimine) compounds, amines, diamines or the combinations thereof.

The amine-ketimine compound can be a compound represented by the following chemical formulas: $R_5R_6C=NR_7NH_2$ or $R_8R_9C=NR_{10}N=CR_{11}R_{12}$, wherein $R_5$, $R_6$, $R_8$, $R_9$, $R_{11}$ and $R_{12}$ are $C_mH_{2m+1}$, and m is any positive integer from 1 to 3, $R_7$ and $R_{10}$ are $C_xH_{2x}$, and x is any positive integer from 6 to 18.

Furthermore, according to the method for producing hollow silica particles of the present invention, said coupling reagent may comprise silicon-ketimine mixtures, the silicon-ketimine mixtures comprise various silicon-ketimine compounds having different substituent groups, siloxane oligomers, amino siloxane compounds, ketone compounds, or the combinations thereof.

The silicon-ketimine compound may be a compound represented by the following chemical formula: $R_1R_2C=N(R_3)Si(OR_4)_3$, wherein $R_1$, $R_2$ and $R_4$ are $C_nH_{2n+1}$, $R_3$ is $C_nH_{2n}$, and n is any positive integer from 1 to 3.

Wherein, said silicon-ketimine compound can be produced from a reaction between amino siloxane compound and a ketone compound. For example, a silicon-ketimine compound, comprising a compound represented by the afore-mentioned chemical formula, is produced from the reaction between APTMS and butanone. Besides, the amine-ketimine compound can be produced from a reaction between diamine compound and a ketone compound. For example, an amine-ketimine compound, comprising a compound represented by the afore-mentioned chemical formula, is produced from the reaction between butanone and a diamine compound with long chain substituent.

Preferably, the additive amount of the organic siloxane compound ranges from $2.5 \times 10^{-3}$ to $5 \times 10^{-2}$ mol per 100 ml water, and more preferably ranges from $5 \times 10^{-3}$ to $2 \times 10^{-2}$ mol per 100 ml water. The additive amount of the amine catalyst may range from $1.0 \times 10^{-4}$ to $7.4 \times 10^{-2}$ mol per 100 ml water, and may preferably range from $1.0 \times 10^{-4}$ to $4.4 \times 10^{-2}$ mol per 100 ml water. Preferably, the additive amount of the silicon-ketimine compound ranges from $3.3 \times 10^{-3}$ to 0.17 grams per 100 ml water, and the additive amount of the amine-ketimine compound ranges from 0.1 to 4 grams. Preferably, the additive amount of the amino siloxane compound such as APTMS may range from $1.1 \times 10^{-4}$ to $1.4 \times 10^{-3}$ mol per 100 ml water; and more preferably, the additive amount of the amino siloxane compound ranges from $1.6 \times 10^{-4}$ to $4 \times 10^{-4}$ mol per 100 ml water. Preferably, an additive amount of the Schiff base compound ranges from $3.2 \times 10^{-4}$ to $1 \times 10^{-2}$ mol per 100 ml water.

According to the method for producing hollow silica particles of the present invention, said low carbon alcohol is a linear or nonlinear alcohol having carbon numbers from 1 to 3, such as, but not limited to, methanol or ethanol. Preferably, the low carbon alcohol solution is 95 vol % ethanol in water.

Preferably, the step (D) of the present method includes washing core-shell silica precipitate by using an ethanol solution to form a dispersion containing cores and silica shells; separating a hollow silica shell precipitate from the afore-mentioned dispersion; and removing the remaining low carbon alcohol solution in the hollow silica shell precipitate to obtain the hollow silica particles.

In the afore-mentioned step (A) and step (B) of the method, in order to completely disperse all reactants in the dispersion and subsequently form a hydrophobic micelle as a hydrophobic core template, the hydrophobic core dispersion is preferably further treated with ultrasonic oscillation. In the afore-mentioned step (B) of the method, the core-shell silica dispersion is preferably agitated at a speed ranging from 50 to 400 rpm for 0.5 to 24 hours to make it well mixed, and the core-shell silica dispersion comprises a core-shell silica precipitate dispersed therein. Preferably, the afore-mentioned step (C) and step (D) further include isolating the core-shell silica precipitate and the hollow silica shell precipitate respectively by centrifugation. The centrifugal speed is about 6000 rpm, and the centrifugal time is about from 5 to 20 minutes. Preferably, the afore-mentioned step (D) further includes drying the hollow silica shell precipitate at a temperature ranging from 50 to 80° C. in order to remove the remaining low carbon alcohol solution in the hollow silica shell precipitate.

In addition, the present invention also provides hollow silica particles, which are produced by the afore-mentioned method. Said hollow silica particles have particle sizes ranging from 50 nm to 3 μm, and have specific surface areas ranging from 110 to 170 m²/g.

Accordingly, the method for producing hollow silica particles of the present invention can utilize the amine-ketimine compound as a core template. By the catalysis of amine catalysts such as APTMS or ammonia, the core-shell silica precipitates are produced via the co-condensation reaction of TEOS and amine-ketimine compound. The hollow silica particles are produced by simply using ethanol to wash the obtained core-shell silica precipitate, without adding additional surfactant for producing hollow silica particles or using acidic or basic solutions for removing the core template.

DETAILED DESCRIPTION OF THE PREFERRED EMBODIMENTS

Hereinafter, one skilled in the arts can easily realize the advantages and effects of the present invention from the following preparation examples and embodiments. Therefore, the description proposed herein is just a preferable example for the purpose of illustrations only, not intended to limit the scope of the invention. Various modifications and variations could be made in order to practice or apply the present invention without departing from the spirit and scope of the invention.

Preparation Example 1

Producing a Core Template Including Amine-Ketimine Compound

First, 1 g of 1,12-diaminododecane and 10 g of butanone is added, and agitated for 60 hours at room temperature to produce a yellow transparent solution comprising a compound with ketimine structure. Wherein, 1,12-diaminododecane is formed in a white solid, and butanone is formed in a colorless transparent liquid.

Then, butanone is removed by vacuum evaporation to obtain a yellowish brown waxy solid mixture comprising a compound with ketimine structure. Wherein, the yellowish brown waxy solid mixture, which is amine-ketimine mixture, comprises $NH_2(CH_2)_{12}NH_2$ (1,12-diaminododecane), $(CH_3)(C_2H_5)C=N(CH_2)_{12}NH_2$, and $(CH_3)(C_2H_5)C=N(CH_2)_{12}N=C(C_2H_5)(CH_3)$. The latter two compounds are used as an amine-ketimine compound according to the present invention. The chemical reaction equation is represented by the following Equation 1:

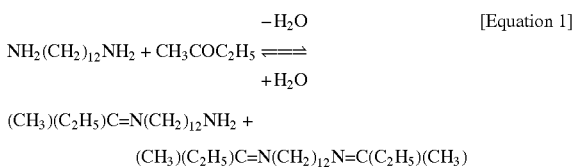

[Equation 1]

Figure 1:
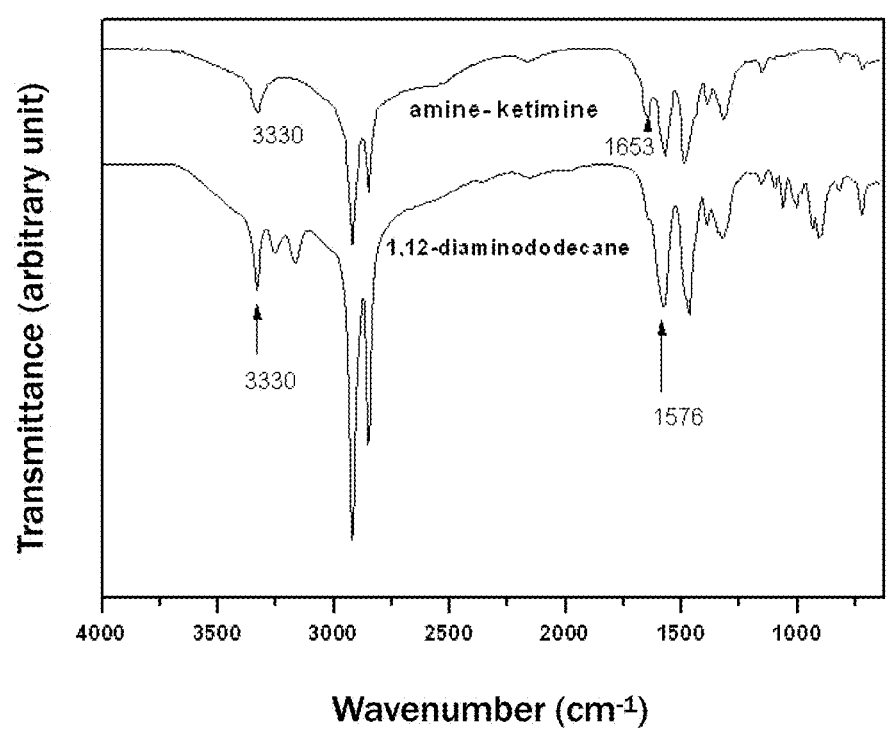
FIG. 1 is an overlay of FTIR spectra of 1,12-diaminododecane and the hydrophobic nucleating reagent including amine-ketimine compound in accordance with Preparation Example 1 of the present invention.

As shown in FIG. 1, 1,12-diaminododecane has $—NH_2$ symmetrical stretching vibration peak at 3330 cm$^{-1}$ and $—NH_2$ bending vibration peak at 1576 cm$^{-1}$. Comparing the FTIR peaks of 1,12-diaminododecane, the experimental results from Fourier Transform Infrared Spectroscopy (FTIR Spectroscopy) demonstrate that the obtained amine-ketimine compounds have a C=N double bond stretching vibration peak at 1653 cm$^{-1}$, other unactive $—NH_2$ symmetrical stretching vibration peak at 3330 cm$^{-1}$, and other unactive $—NH_2$ bending vibration peak at 1576 cm$^{-1}$. Hence, an amine-ketimine compound as a core template is produced by the afore-mentioned method.

Preparation Example 2

Producing a Coupling Reagent Including Silicon-Ketimine Compound

First, 1 g of γ-aminopropyltrimethoxysilane (APTMS) and 5 g of butanone is added, and agitated for 72 hours at room temperature to produce a yellow transparent solution comprising a compound with ketimine structure, i.e. silicon-ketimine mixture. Wherein, APTMS is formed in a colorless transparent liquid, and butanone is formed in a colorless transparent liquid.

The silicon-ketimine mixture comprises APTMS, amine-ketiminated organic siloxane compound, siloxane oligomer, and butanone. Wherein, the amine-ketiminated organic siloxane compound is used as a silicon-ketimine compound according to the present invention. The chemical reaction equation is represented by the following Equation 2:

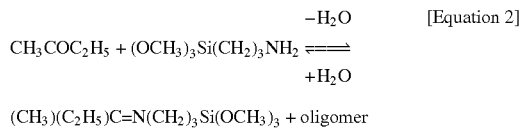

[Equation 2]

Figure 2:
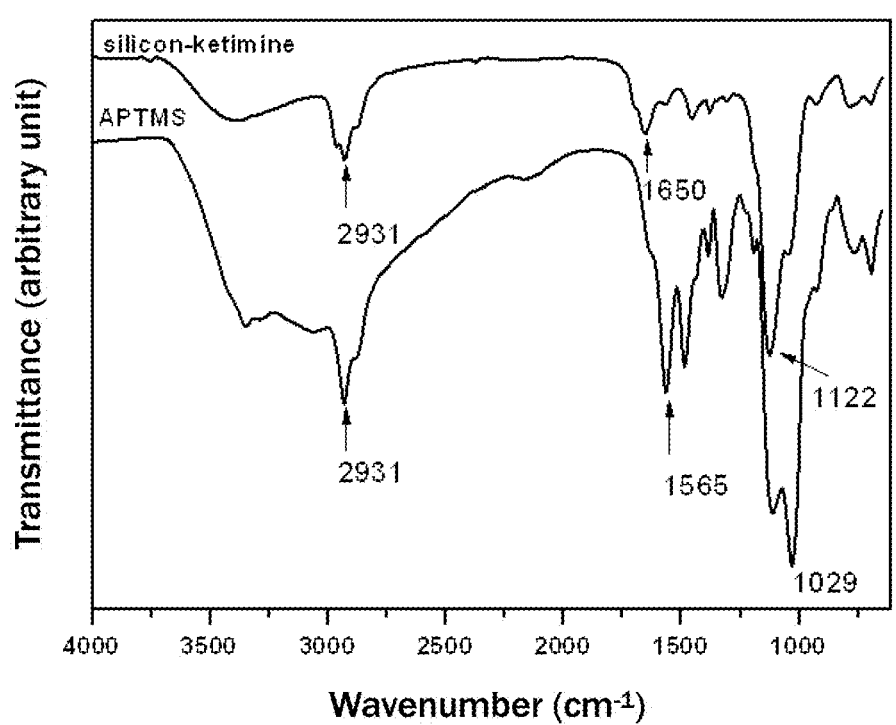
FIG. 2 is an overlay of FTIR spectra of the coupling reagent including silicon-ketimine compound and APTMS in accordance with Preparation Example 2 of the present invention.

As shown in FIG. 2, APTMS has $—CH_2$ symmetric stretching vibrations peak at 2931 cm$^{-1}$ and $—NH_2$ bending vibration peak at 1565 cm$^{-1}$. Comparing the FTIR peaks of APTMS, the experimental results from FTIR Spectroscopy demonstrate that the obtained silicon-ketimine compound has a C=N double bond stretching vibration peak at 1650 cm$^{-1}$, other unactive $—NH_2$ symmetrical stretching vibration peak at 3356 cm$^{-1}$, and other unactive $—NH_2$ bending vibration peak at 1565 cm$^{-1}$. The experimental results indicated that only little unactive amine reactant remained. Besides, a strong peak at 1122 cm$^{-1}$ represents the Si—O—Si bond non-symmetrical stretching vibration, and a peak at 800 cm$^{-1}$ represents its symmetrical stretching vibration. The peak of Si—OH stretching vibration peak and the peak of hydroxides stretched by hydrogen bonds is at 3300 to 3600 cm$^{-1}$. Hence, a silicon-ketimine compound as a coupling reagent can be produced by the afore-mentioned method.

According to the afore-mentioned process of Preparation Example 1 and Preparation Example 2, various amine-ketimine compounds and various silicon-ketimine compounds having different substituent groups can be produced respectively from a reaction between different diamine reactants and ketone compounds, and from a reaction between different siloxanes and ketone compounds.

Embodiment 1

First, 0.8 g of amine-ketimine mixture, as a hydrophobic nucleating reagent for producing the hydrophobic core dispersion, is mixed with 100 ml of deionized water at room temperature. Then, the amine-ketimine mixture is further dispersed by ultrasonic-oscillation to make it completely disperse in the deionized water to obtain a hydrophobic core dispersion.

Wherein, the amine-ketimine mixture comprises amine-ketimine compound, for example:
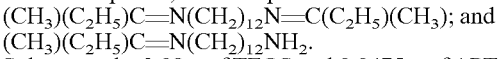
$(CH_3)(C_2H_5)C=N(CH_2)_{12}NH_2$.

Subsequently, 2.08 g of TEOS and 0.0475 g of APTMS is added into the afore-mentioned hydrophobic core dispersion, in order to obtain core-shell silica dispersion.

When adding the afore-mentioned reactants, the core-shell silica dispersion is further treated with ultrasonic oscillation and agitated at 120 rpm. The ultrasonic oscillation is stopped after adding organic siloxanes for 5 minutes, and the agitation is still continued for 20 hours.

Then, the core-shell silica dispersion is centrifuged at 6000 rpm, in order to separate a core-shell silica precipitate from the core-shell silica dispersion.

After that, the core-shell silica dispersion is further dispersed with 150 ml of ethanol, in order to form a dispersion containing cores and silica shells, and agitated at room temperature for 1 hour. The core template of the core-shell silica dispersion is dissolved by 95 vol % ethanol.

Subsequently, the dispersion containing cores and silica shells is further centrifuged at 6000 rpm to obtain white hollow silica shell precipitate. Wherein, the white hollow silica shell precipitate is repeatedly washed by using ethanol and water, and repeatedly centrifuged to remove the unexpected impurities.

Finally, the white hollow silica shell precipitate is dried in oven at 50° C. for 50 hours, and thus the hollow silica particles having particle sizes ranging from 50 nm to 3 μm are produced.

Figure 3:
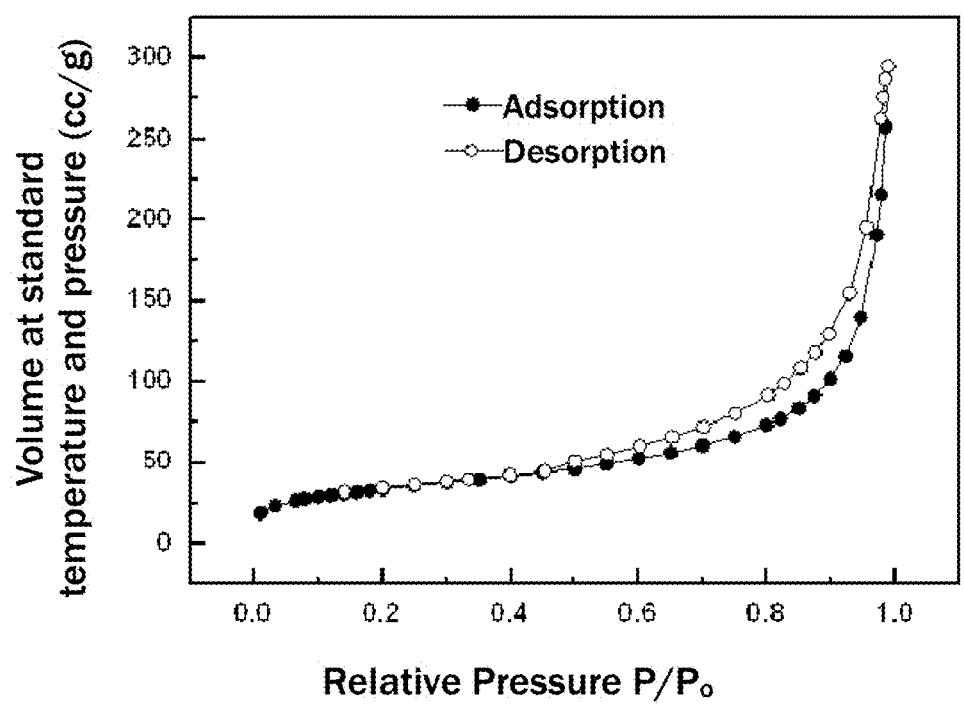
FIG. 3 is nitrogen adsorption-desorption isotherms of the hollow silica particles in accordance with Embodiment 1.

As shown by FIG. 3, the specific surface area of the hollow silica particles is further tested via Brunauer-Emmett-Teller experiment, BET experiment, and the test results show that the specific surface area of Embodiment 1 is about 147 m$^2$/g.

Embodiment 2

First, 0.8 g of amine-ketimine mixture, as a hydrophobic nucleating reagent for producing the hydrophobic core dispersion, is mixed with 1 ml of ammonia and 100 ml of deionized water at room temperature. Then, the amine-ketimine mixture is further dispersed in this solution by ultrasonic-oscillation to make it completely disperse in the deionized water to obtain a hydrophobic core dispersion.

In the present embodiment, the amine-ketimine mixture comprises amine-ketimine compounds, for example:

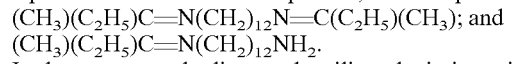

In the present embodiment, the silicon-ketimine mixture comprises silicon-ketimine compound, for example:

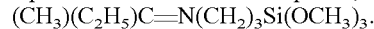

Then, 2.08 g of TEOS and silicon-ketimine mixture, as a coupling reagent, is added into the afore-mentioned hydrophobic core dispersion, in order to obtain core-shell silica dispersion.

After that, the present embodiment is proceeded with the same following process as Embodiment 1. Finally, the hollow silica particles having article sizes ranging from 50 nm to several μm are produced.

Embodiment 3

First, 0.8 g of amine-ketimine mixture, as a hydrophobic nucleating reagent for producing the hydrophobic core dispersion, is mixed with 3 ml of ammonia and 100 ml of deionized water at room temperature. Then, the amine-ketimine mixture is further dispersed in this solution by ultrasonic-oscillation to make it completely disperse in the deionized water to obtain a hydrophobic core dispersion.

In the present embodiment, the amine-ketimine mixture comprises amine-ketimine compounds, for example:

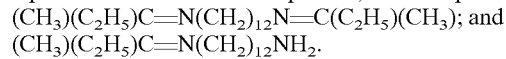

Then, 2.08 g of TEOS is added into the afore-mentioned hydrophobic core dispersion, in order to obtain a core-shell silica dispersion.

After that, the present embodiment is proceeded with the same following process as Embodiment 1. Finally, the hollow silica particles having particle sizes ranging from 50 nm to several, about 3 μm, are produced.

In conclusion, the method for producing hollow silica particles in accordance with the present invention utilizes a hydrophobic nucleating reagent comprising amine-ketimine compound as the core template. The hydrophobic nucleating reagent is subjected to a co-condensation with TEOS under the catalysis of amine catalyst, and forming a compound with a silica shell and a core template therein. Then, the core template is removed by simple process of dispersion, centrifugation, and washing with ethanol. Finally, hollow silica particles with a surface having amino functional groups are produced without using any additional surfactants.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for producing hollow silica particles, comprising steps of:
   (A) mixing an amount of amine-ketimine compound and water to obtain a hydrophobic core dispersion;
   (B) adding an amount of an organic siloxane compound and/or an amount of a coupling reagent into the hydrophobic core dispersion to obtain a core-shell silica dispersion, wherein the coupling reagent includes an amino siloxane compound or a silicon-ketimine compound;
   (C) separating a core-shell silica precipitate from the core-shell silica dispersion; and
   (D) washing the core-shell silica precipitate by using a low carbon alcohol solution to obtain the hollow silica particles.

2. The method according to claim 1, wherein the step (A) further comprises mixing ammonia with the amine-ketimine compound and water to obtain the hydrophobic core dispersion, or the step (B) further comprises adding the ammonia into the hydrophobic core dispersion obtain the core-shell silica dispersion and to form the core-shell silica precipitate.

3. The method according to claim 2, wherein the ammonia contains an amount of $NH_3$ ranging from $1.0 \times 10^{-4}$ to $7.4 \times 10^{-2}$ moles per 100 ml water.

4. The method according to claim 1, wherein the step (D) further comprises: washing the core-shell silica precipitate by using an ethanol solution to form a dispersion containing cores and silica shells; separating a hollow silica shell precipitate from the dispersion containing cores and silica shells, and removing the remaining low carbon alcohol solution in the hollow silica shell precipitate to obtain the hollow silica particles.

5. The method according to claim 2, wherein the step (D) further comprises washing the core-shell silica precipitate by using an ethanol solution to form a dispersion containing cores and silica shells; separating a hollow silica shell precipitate from the dispersion containing cores and silica shells, and removing the remaining low carbon alcohol solution in the hollow silica shell precipitate to obtain the hollow silica particles.

6. The method according to claim 1, wherein the amount of the amine-ketimine compound ranges from 0.1 to 4 grams per 100 ml water.

7. The method according to claim 2, wherein the amount of the amine-ketimine compound ranges from 0.1 to 4 grams per 100 ml water.

8. The method according to claim 1, wherein the amount of the silicon-ketimine compound ranges from $3.3 \times 10^{-3}$ to 0.17 grams per 100 ml water.

9. The method according to claim 2, wherein the amount of the silicon-ketimine compound ranges from $3.3 \times 10^{-3}$ to 0.17 grams per 100 ml water.

10. The method according to claim 1, wherein the amount of the organic siloxane compound ranges from $5 \times 10^{-3}$ to $2 \times 10^{-2}$ mol (moles) per 100 ml water.

11. The method according to claim 2, wherein the amount of the organic siloxane compound ranges from $5 \times 10^{-3}$ to $2 \times 10^{-2}$ mol per 100 ml water.

12. The method according to claim 1, wherein the coupling reagent is amino siloxane compound and the amount of the amino siloxane compound ranges from $1.6 \times 10^{-4}$ to $4 \times 10^{-4}$ mol per 100 ml water.

13. The method according to claim 2, wherein the coupling reagent is amino siloxane compound and the amount of the amino siloxane compound ranges from $1.6 \times 10^{-4}$ to $4 \times 10^{-4}$ mol per 100 ml water.

14. The method according to claim 1, wherein the organic siloxane compound is tetraethoxysilane.

15. The method according to claim 2, wherein the organic siloxane compound is tetraethoxysilane.

16. The method according to claim 1, wherein the amino siloxane compound is γ-aminopropyltrimethoxysilane.

17. The method according to claim 2, wherein the amino siloxane compound is γ-aminopropyltrimethoxysilane.

18. The method according to claim 1, wherein the silicon-ketimine compound comprises a compound represented by a following chemical formula:

$$R_1R_2C=N(R_3)Si(OR_4)_3,$$

wherein $R_1$, $R_2$ and $R_4$ are $C_nH_{2n+1}$, $R_3$ is $C_nH_{2n}$, and n is any positive integer from 1 to 3.

19. The method according to claim 1, wherein the amine-ketimine compound comprises a compound represented by following chemical formulas:

$$R_5R_6C=NR_7NH_2 \text{ or } R_8R_9C=NR_{10}N=CR_{11}R_{12},$$

wherein $R_5$, $R_6$, $R_8$, $R_9$, $R_{11}$ and $R_{12}$ are $C_mH_{2m+1}$, and m is any positive integer from 1 to 3, $R_7$ and $R_{10}$ are $C_xH_{2x}$, and x is any positive integer from 6 to 18.

* * * * *